US012519223B2

(12) United States Patent
Deng et al.

(10) Patent No.: US 12,519,223 B2
(45) Date of Patent: Jan. 6, 2026

(54) CALIBRATION METHOD AND CALIBRATION DEVICE FOR LARGE-SIZE ANTENNA ARRAYS

(71) Applicant: Industrial Technology Research Institute, Hsinchu (TW)

(72) Inventors: Juinn-Horng Deng, Taoyuan (TW); Siang-He Huang, Taichung (TW); Chung-Lien Ho, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 527 days.

(21) Appl. No.: 17/984,260

(22) Filed: Nov. 10, 2022

(65) Prior Publication Data

US 2024/0113427 A1 Apr. 4, 2024

(30) Foreign Application Priority Data

Sep. 27, 2022 (TW) ................................. 111136587

(51) Int. Cl.
*H01Q 3/36* (2006.01)
*H01Q 3/26* (2006.01)
*H01Q 3/28* (2006.01)

(52) U.S. Cl.
CPC ............... *H01Q 3/267* (2013.01); *H01Q 3/28* (2013.01); *H01Q 3/36* (2013.01)

(58) Field of Classification Search
CPC ............. H01Q 3/267; H01Q 3/28; H01Q 3/36
See application file for complete search history.

(56) References Cited

U.S. PATENT DOCUMENTS 10,348,422 B2 7/2019 Morishige et al.
10,601,526 B2 3/2020 Morishige et al.
10,680,725 B1 6/2020 Lu et al.
10,917,228 B2 2/2021 Nuimura
11,038,601 B2 6/2021 Sebastian et al.
11,128,389 B2 9/2021 Morishige et al.
2018/0123707 A1 5/2018 Morishige et al.
2019/0273565 A1 9/2019 Morishige et al.
2020/0162173 A1 5/2020 Morishige et al.
2020/0274627 A1 8/2020 Motoi et al.
2020/0336221 A1 10/2020 Sebastian et al.

(Continued)

FOREIGN PATENT DOCUMENTS

CN 1354836 6/2002
CN 1504791 6/2004

(Continued)

OTHER PUBLICATIONS

"Office Action of Taiwan Counterpart Application", issued on Jul. 10, 2023, p. 1-p. 8.
Seiji Mano et al., "A Method for Measuring Amplitude and Phase of Each Radiating Element of a Phased Array Antenna", Electronics and Communications in Japan, vol. J65-B, No. 5, May 1982, pp. 58-64.

(Continued)

*Primary Examiner* — Robert W Hodge
*Assistant Examiner* — Bongani Jabulani Mashele
(74) *Attorney, Agent, or Firm* — JCIPRNET

(57) ABSTRACT

A calibration method and a calibration device for a large-size antenna array are provided. The calibration method includes: performing an intra-group calibration on each antenna group in a plurality of antenna groups; and powering on each of the antenna groups of the plurality of antenna groups to perform an inter-group calibration on a first antenna group in the plurality of antenna groups.

13 Claims, 10 Drawing Sheets

(56) References Cited

U.S. PATENT DOCUMENTS

| | | | |
|---|---|---|---|
| 2020/0389285 A1 | 12/2020 | Nuimura | |
| 2021/0367685 A1 | 11/2021 | Morishige et al. | |
| 2022/0099722 A1 | 3/2022 | Wang et al. | |
| 2022/0200161 A1 | 6/2022 | Takahashi | |

FOREIGN PATENT DOCUMENTS

| | | | | |
|---|---|---|---|---|
| CN | 1504792 | | 6/2004 | |
| CN | 1167962 | | 9/2004 | |
| CN | 1808103 | | 7/2006 | |
| CN | 1302311 | | 2/2007 | |
| CN | 100567969 | | 12/2009 | |
| CN | 106788631 | A * | 5/2017 | ............ H04B 17/11 |
| CN | 106992363 | | 7/2017 | |
| CN | 105323021 | | 3/2018 | |
| CN | 107329127 | | 9/2019 | |
| CN | 110476300 | | 11/2019 | |
| CN | 111362809 | | 7/2020 | |
| CN | 113406403 | | 11/2021 | |
| CN | 114097099 | | 2/2022 | |
| EP | 3605732 | A1 * | 2/2020 | ............ G01R 29/10 |
| EP | 3605732 | | 1/2022 | |
| TW | 076246 | | 4/1986 | |
| TW | 406488 | | 9/2000 | |
| TW | 202040872 | | 11/2020 | |

OTHER PUBLICATIONS

Victor Djigan et al., "Antenna Array Calibration Algorithm Based on Phase Perturbation", IEEE East-West Design and Test Symposium (EWDTS), Sep. 13-16, 2019, pp. 1-5.

Hong-Jib Yoon et al., "Improved Rotating-Element Electric-Field Vector Method for Fast Far-Field Phased Array Calibration", IEEE Transactions on Antennas and Propagation, vol. 69, No. 11, Jun. 2, 2021, pp. 8021-8026.

Rui Long et al., "Fast Amplitude-Only Measurement Method for Phased Array Calibration", IEEE Transactions on Antennas and Propagation, vol. 65, No. 4, Nov. 16, 2016, pp. 1815-1822.

Shitikov A M. et al., "Multi-Element PAA Calibration With REV Method", International Conference on Antenna Theory and Techniques, Sep. 9-12, 2003, pp. 761-764.

Cheng-Nan Hu, "A Novel Method for Calibrating Deployed Active Antenna Arrays", IEEE Transactions on Antennas and Propagation, vol. 63, No. 4, Jan. 29, 2015, pp. 1650-1657.

Zhai Yu et al., "Ambiguity of rotating-element electric-field vector method and elimination method", Journal of Beijing University of Aeronautics and Astronautics, vol. 38, No., 11, with English abstract, Nov. 2012, pp. 1450-1453.

Minggang Liu et al., "Combined Rotating-element Electric-field Vector (CREV) Method for nearfield Calibration of Phased Array Antenna", IEEE International Conference on Microwave and Millimeter Wave Technology, Apr. 18-21, 2007, pp. 1-4.

* cited by examiner

CALIBRATION METHOD AND CALIBRATION DEVICE FOR LARGE-SIZE ANTENNA ARRAYS

CROSS-REFERENCE TO RELATED APPLICATION

This application claims the priority benefit of Taiwan application serial no. 111136587, filed on Sep. 27, 2022. The entirety of the above-mentioned patent application is hereby incorporated by reference herein and made a part of this specification.

TECHNICAL FIELD

The disclosure relates to an antenna calibration technique, and in particular, to a calibration method and a calibration device for a large-size antenna array.

BACKGROUND

An antenna array is formed by several antennas, wherein different antennas may be configured with different amplitudes or phase angles to radiate different electric fields. The plurality of electric fields radiated by the plurality of antennas may be combined into a composite electric field of the antenna array. A communication chip may configure the amplitude or the phase angle of each of the antennas to adjust the composite electric field of the antenna array, thereby performing directional transmission.

In order to correctly adjust the composite electric field of the antenna array, it is important to calibrate the individual antennas in the antenna array. The rotating element electric field vector (REV) method is often used to perform calibration of an antenna array. However, as the size of the antenna array becomes larger, the amount of computation needed to perform the REV method is also increased significantly. Therefore, calibrating a large-size antenna array is very time-consuming.

SUMMARY

The disclosure provides a calibration method and a calibration device for a large-scale antenna array that may reduce the computational complexity and time needed for calibrating a large-scale antenna array.

A calibration method for a large-scale antenna array of the disclosure, wherein the large-scale antenna array includes a plurality of antenna groups, wherein the calibration method includes: performing an intra-group calibration on each antenna in a plurality of antenna groups; and powering on each of the antenna groups of the plurality of antenna groups to perform an inter-group calibration on a first antenna group in the plurality of antenna groups.

In an embodiment of the disclosure, the calibration method further includes: performing an intra-group calibration based on a rotating element electric field vector method.

In an embodiment of the disclosure, the step of performing the intra-group calibration based on the rotating element electric field vector method includes: performing the intra-group calibration on the first antenna group, including: powering on the first antenna in the first antenna group at a first power, and powering on other antennas in the first antenna group at a second power, wherein the second power is a product of the first power and a real number, wherein the real number is greater than one; adjusting a phase angle of the first antenna to measure a composite electric field vector (EFV) of the first antenna group after the first antenna and the other antennas are powered on; and obtaining a first solution and a second solution corresponding to a calibration value of the first antenna according to the composite EFV based on the rotating element electric field vector method.

In an embodiment of the disclosure, the step of performing the intra-group calibration on the first antenna group further includes: selecting the first solution from the first solution and the second solution to calibrate the first antenna, wherein the first solution satisfies the following equation:

$$\left(Y > k'_{n,m}, k'_{n,m}\right) = \frac{E_{n,m}}{E_{0,m}}, Y^2 = \left(\cos X'_{n,m} - k'_{n,m}\right)^2 + \sin^2 X'_{n,m}, X'_{n,m}\phi_{n,m} - \phi_{0,m}$$

wherein $E_{n,m}$ is an amplitude of the first antenna, $E_{0,m}$ is an amplitude of an initial composite EFV of the first antenna group, $\phi_{n,m}$ is an initial phase angle of the first antenna, and $\phi_{0,m}$ is a phase angle of the initial composite EFV.

In an embodiment of the disclosure, the calibration method further includes: performing the inter-group calibration based on the rotating element electric field vector method.

In an embodiment of the disclosure, the step of performing the inter-group calibration based on the rotating element electric field vector method includes: powering on the first antenna group in the plurality of antenna groups at a first power, and powering on other antenna groups in the plurality of antenna groups at a second power, wherein the second power is a product of the first power and a real number, wherein the real number is greater than one; adjusting a phase angle of the first antenna group to measure a composite EFV of the plurality of antenna groups after the first antenna group and the other antenna groups are powered on; and obtaining a first solution and a second solution corresponding to a calibration value of the first antenna group according to the composite EFV based on the rotating element electric field vector method.

In an embodiment of the disclosure, the step of performing the inter-group calibration based on the rotating element electric field vector method further includes: selecting the first solution from the first solution and the second solution to calibrate the first antenna group, wherein the first solution satisfies the following equation:

$$(Y > k'_m, k'_m) = \frac{E_m}{E_0}, Y^2 = (\cos X'_m - k'_m)^2 + \sin^2 X'_m, X'_m = \phi_m - \phi_0$$

wherein $E_m$ is an amplitude of the first antenna group, $E_0$ is an amplitude of an initial composite EFV of the plurality of antenna groups, $\phi_m$ is an initial phase angle of the first antenna group, and $\phi_0$ is a phase angle of the initial composite EFV.

In an embodiment of the disclosure, the plurality of antenna groups includes at least three antenna groups.

A calibration method for a large-scale antenna array of the disclosure, wherein the large-scale antenna array includes a first antenna group and a second antenna group, wherein the calibration method includes: performing an intra-group calibration on the first antenna group; setting the first antenna group and the second antenna group as an antenna group set, wherein the second antenna group includes a first antenna; and powering on the first antenna group and the second antenna group to perform the intra-group calibration on the first antenna in the antenna group set.

In an embodiment of the disclosure, the calibration method further includes: performing the intra-group calibration on the first antenna group based on a rotating element electric field vector method.

In an embodiment of the disclosure, the step of performing the intra-group calibration on the first antenna group based on the rotating element electric field vector method includes: powering on a second antenna in the first antenna group at a first power, and powering on other antennas in the first antenna group at a second power, wherein the second power is a product of the first power and a real number, wherein the real number is greater than one; adjusting a phase angle of the second antenna to measure a composite EFV of the first antenna group after the second antenna and the other antennas are powered on; and obtaining a first solution and a second solution corresponding to a calibration value of the second antenna according to the composite EFV based on the rotating element electric field vector method.

In an embodiment of the disclosure, the step of performing the intra-group calibration on the first antenna group based on the rotating element electric field vector method further includes: selecting the first solution from the first solution and the second solution to calibrate the second antenna, wherein the first solution satisfies the following equation:

$$Y > k'_{n,m},\ k'_{n,m} = \frac{E_{n,m}}{E_{0,m}},\ Y^2 = (\cos X'_{n,m} - k'_{n,m})^2 + \sin^2 X'_{n,m},\ X'_{n,m} = \phi_{n,m} - \phi_{0,m}$$

wherein $E_{n,m}$ is an amplitude of the second antenna, $E_{0,m}$ is an amplitude of an initial composite EFV of the first antenna group, $\phi_{n,m}$ is an initial phase angle of the second antenna, and $\phi_{0,m}$ is a phase angle of the initial composite EFV.

In an embodiment of the disclosure, the calibration method further includes: performing the intra-group calibration on the first antenna in the antenna group set based on the rotating element electric field vector method.

In an embodiment of the disclosure, the step of performing the intra-group calibration on the first antenna in the antenna group set based on the rotating element electric field vector method includes: powering on the first antenna in the antenna group set at a first power, and powering on other antennas in the antenna group set at a second power, wherein the second power is a product of the first power and a real number, wherein the real number is greater than one; adjusting a phase angle of the first antenna to measure a composite EFV of the antenna group set after the first antenna and the other antennas are powered on; obtaining a first solution and a second solution corresponding to a calibration value of the first antenna according to the composite EFV based on the rotating element electric field vector method.

In an embodiment of the disclosure, the step of performing the intra-group calibration on the first antenna in the antenna group set based on the rotating element electric field vector method further includes: selecting the first solution from the first solution and the second solution to calibrate the first antenna, wherein the first solution satisfies the following equation:

$$Y > k'_{n,i},\ k'_{n,i} = \frac{E_{n,i}}{E_{0,i}},\ Y^2 = (\cos X'_{n,i} - k'_{n,i})^2 + \sin^2 X'_{n,i},\ X'_{n,i} = \phi_{n,i} - \phi_{0,i}$$

wherein $E_{n,i}$ is an amplitude of the first antenna, $E_{0,i}$ is an amplitude of an initial composite EFV of the antenna group set, $\phi_{n,i}$ is an initial phase angle of the first antenna, and $\phi_{0,i}$ is a phase angle of the initial composite EFV.

The disclosure provides a calibration device for a large-scale antenna array, wherein the large-scale antenna array includes a plurality of antenna groups, and the calibration device includes a transceiver and a processor. The transceiver is coupled to the large-scale antenna array. The processor is coupled to the transceiver, wherein the processor is configured to perform: performing an intra-group calibration on each of the antenna groups in the plurality of antenna groups via the transceiver; and powering on each of the antenna groups of the plurality of antenna groups via the transceiver to perform an inter-group calibration on a first antenna group in the plurality of antenna groups.

The disclosure provides a calibration device for a large-scale antenna array, wherein the large-scale antenna array includes a first antenna group and a second antenna group, and the calibration device includes a transceiver and a processor. The transceiver is coupled to the large-scale antenna array. The processor is coupled to the transceiver, wherein the processor is configured to perform: performing an intra-group calibration on the first antenna group via the transceiver; setting the first antenna group and the second antenna group as an antenna group set, wherein the second antenna group includes a first antenna; and powering on the first antenna group and the second antenna group to perform the intra-group calibration on the first antenna in the antenna group set.

Based on the above, the calibration device of the disclosure may divide a plurality of antenna areas in a large-scale antenna array into several antenna groups, and sequentially perform an intra-group calibration and an inter-group calibration on each of the antenna groups, thereby quickly completing the calibration of the large-scale antenna array.

DETAILED DESCRIPTION OF DISCLOSED EMBODIMENTS

Figure 1:
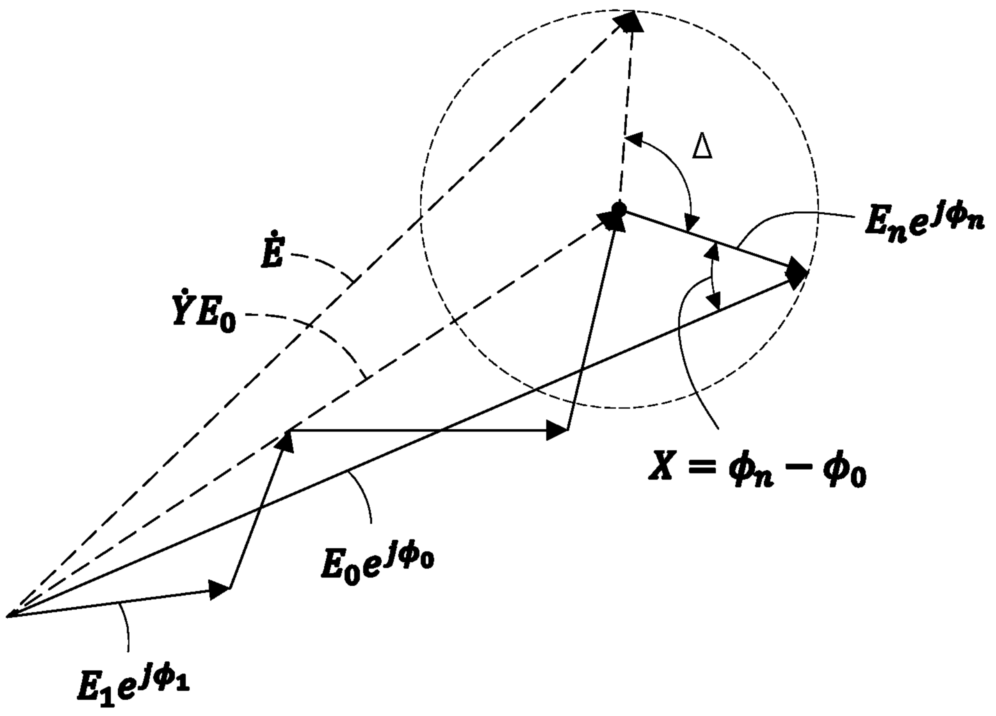
FIG. 1 shows a schematic diagram of performing the REV method on the n-th antenna in an antenna array.

An antenna may be the smallest radiating unit in an antenna array, wherein each of the antennas may be configured with a dedicated amplitude or phase angle. The REV method may generally be employed to perform calibration on each of the antennas in the antenna array. FIG. 1 shows a schematic diagram of performing the rotating electric field vector (REV) method on the n-th antenna in an antenna array. When all of the antennas in the antenna array are powered on, the composite electric field vector (EFV) of the antenna array is given by equation (1), wherein E represents the composite EFV of the antenna array, $E_0$ represents the amplitude of the initial composite EFV of the antenna array, $\phi_0$ represents the phase angle of the initial composite EFV of the antenna array, $E_n$ represents the amplitude of the n-th antenna in the antenna array (i.e.: the antenna to be calibrated), and $\phi_n$ represents the initial phase angle of the n-th antenna in the antenna array. When performing the REV method on the n-th antenna, the phase angle Δ may be adjusted to rotate the phase angle of $E_n e^{j(\phi_n+\Delta)}$ by 360 degrees, and the composite EFV $\dot{E}$ of each of the phase angles may be measured. In order to calibrate the n-th antenna, it is necessary to obtain the relative amplitude and the relative phase angle of the n-th antenna, as shown in equation (2), wherein k represents the relative amplitude of the n-th antenna, and X represents the relative phase angle of the n-th antenna.

$$\dot{E} = \left(E_0 e^{j\phi_0} - E_n e^{j\phi_n}\right) + E_n e^{j(\phi_n+\Delta)} \tag{1}$$

$$\begin{cases} k = \dfrac{E_n}{E_0} \\ X = \phi_n - \phi_0 \end{cases} \tag{2}$$

Figure 2:
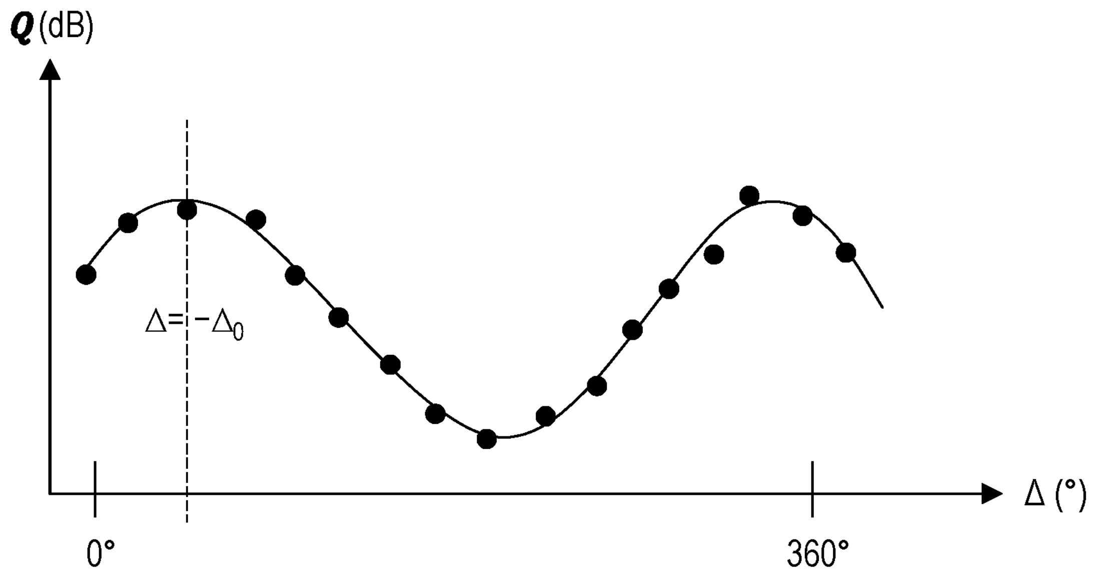
FIG. 2 shows a schematic diagram of relative power corresponding to composite EFV.

The relative amplitude k and the relative phase angle X of the n-th antenna may be calculated according to equations (3) to (6), wherein Q represents the relative power of the composite EFV $\dot{E}$, $\Delta_0$ represents the initial phase angle of the n-th antenna (i.e.: $\Delta_0$ is equal to $\phi_0$ as shown in equation (2)), $Q_{max}$ represents the maximum value of the relative power Q, $Q_{min}$ represents the minimum value of the relative power Q, $E_{max}$ represents the maximum value of $|\dot{E}|$, and $E_{min}$ represents the minimum value of $|\dot{E}|$. FIG. 2 shows a schematic diagram of the relative power Q corresponding to the composite EFV $\dot{E}$. As may be seen from FIG. 2, when the phase angle Δ is adjusted so that the relative power Q is equal to the maximum value $Q_{max}$, $\Delta = -\Delta_0$.

$$\begin{cases} Q \equiv \dfrac{|\dot{E}|^2}{E_0^2} = (Y^2 + k^2) + 2kY\cos(\Delta + \Delta_0) \\ Y^2 = (\cos X - k)^2 + \sin^2 X \end{cases} \tag{3}$$

$$\tan\Delta_0 = \frac{\sin X}{\cos X - k} \tag{4}$$

$$r^2 = \frac{Q_{max}}{Q_{min}} = \frac{(Y+k)^2}{(Y-k)^2} \tag{5}$$

$$r = \frac{E_{max}}{E_{min}} \tag{6}$$

$$r = \pm\left(\frac{Y+k}{Y-k}\right)$$

satisfies the above equation. Accordingly, the first solution $(k_1, X_1)$ and the second solution $(k_2, X_2)$ for the relative amplitude k and the relative phase angle X may be solved as shown in equations (7) and (8), respectively, wherein the first solution $(k_1, X_1)$ corresponds to the case of $Y>k$, and the second solution $(k_2, X_2)$ corresponds to the case of $Y<k$. Generally speaking, the probability that the first solution $(k_1, X_1)$ is a positive solution is much higher than the probability that the second solution $(k_2, X_2)$ is a positive solution. However, as the size of the antenna array is increased, the probability that the second solution $(k_2, X_2)$ is a positive solution is gradually increased. Therefore, when the size of the antenna array is extremely large, it takes a lot of computing resources to verify which of the first solution $(k_1, X_1)$ and the second solution $(k_2, X_2)$ is the positive solution in the process of performing the REV method.

$$\begin{cases} k \equiv k_1 = \dfrac{\Gamma}{\sqrt{1 + 2\Gamma\cos\Delta_0 + \Gamma^2}} \\ X \equiv X_1 = \tan^{-1}\left(\dfrac{\sin\Delta_0}{\cos\Delta_0 + \Gamma}\right) \\ \Gamma = \dfrac{r-1}{r+1} = \dfrac{k}{Y},\ \dfrac{k}{Y} < 1 \end{cases} \tag{7}$$

$$\begin{cases} k \equiv k_2 = \dfrac{\Gamma}{\sqrt{1 + 2\Gamma\cos\Delta_0 + \Gamma^2}} \\ X \equiv X_2 = \tan^{-1}\left(\dfrac{\sin\Delta_0}{\cos\Delta_0 + (1/\Gamma)}\right) \\ \Gamma = \dfrac{r-1}{r+1} = \dfrac{Y}{k},\ \dfrac{Y}{k} < 1 \end{cases} \tag{8}$$

Figure 3:
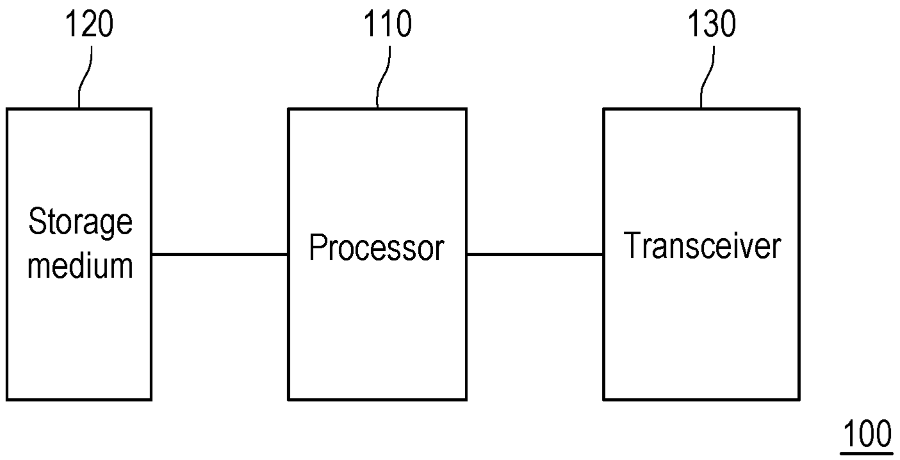
FIG. 3 is a schematic diagram of a calibration device for a large-scale antenna array shown according to an embodiment of the disclosure.

In order to reduce the computational complexity and the time needed for calibrating a large-scale antenna array, the disclosure provides a calibration device and a calibration method that may accelerate the calibration of a two-dimensional large-scale antenna array. FIG. 3 is a schematic diagram of a calibration device 100 for a large-scale antenna array shown according to an embodiment of the disclosure. The calibration device 100 may include a processor 110, a storage medium 120, and a transceiver 130.

The processor 110 is, for example, a central processing unit (CPU), or other programmable general-purpose or special-purpose micro control units (MCUs), microprocessors, digital signal processors (DSPs), programmable controllers, application-specific integrated circuits (ASICs), graphics processing units (GPUs), image signal processors (ISPs), image processing units (IPUs), arithmetic logic units (ALUs), complex programmable logic devices (CPLDs), field-programmable gate arrays (FPGAs), or other similar elements or a combination of the above elements. The processor 110 may be coupled to the storage medium 120 and the transceiver 130, and access and execute a plurality of modules and various application programs stored in the storage medium 120.

The storage medium 120 is, for example, any type of fixed or removable random-access memory (RAM), read-only memory (ROM), or flash memory, hard disk drive (HDD), solid-state drive (SSD), or similar elements or a combination of the above elements configured to store a plurality of modules or various applications that may be executed by the processor 110.

The transceiver 130 transmits and receives a signal in a wireless or wired manner. The transceiver 130 may also execute operations such as low noise amplification, impedance matching, frequency mixing, up or down frequency conversion, filtering, amplification, and the like. The transceiver 130 may be coupled to a large-scale antenna array. The calibration device 100 may obtain various parameters of the large-scale antenna array via the transceiver 130, including the measurement results of the electric field vector.

Figure 4:
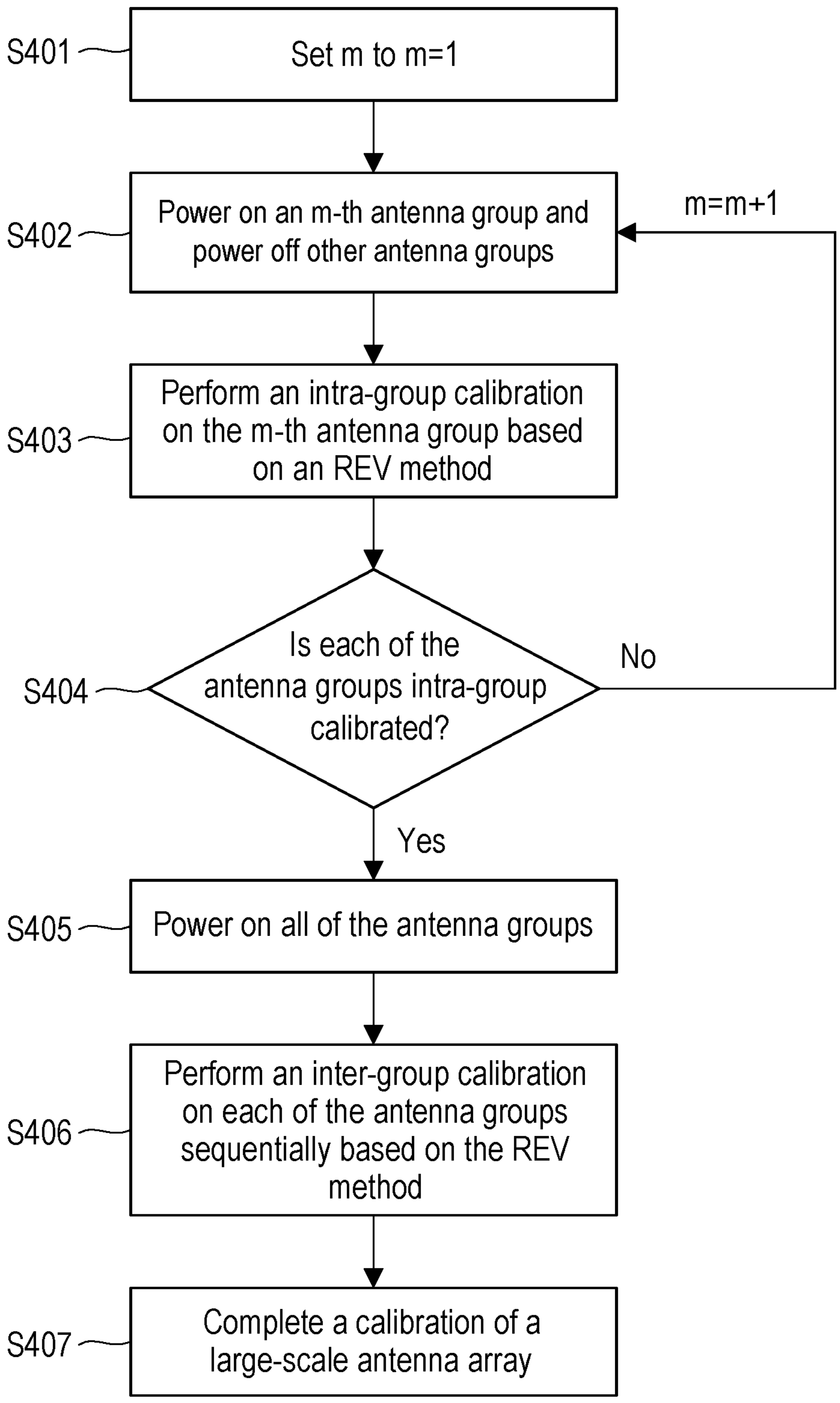
FIG. 4 is a flowchart of a calibration method for a large-scale antenna array shown according to an embodiment of the disclosure.

FIG. 4 is a flowchart of a calibration method for a large-scale antenna array shown according to an embodiment of the disclosure, wherein the calibration method may be implemented by the calibration device 100 shown in FIG. 3. The calibration method is used to calibrate a large-scale antenna array 400 shown in FIG. 5. The large-scale antenna array 400 may include a plurality of antenna groups, such as antenna groups 410, 420, 430, and 440, and each of the antenna groups may include a plurality of antennas. For example, the antenna group 410 may include a plurality of antennas such as antennas 411, 412, 413, 414, 415, 416, 417, and 418. The antenna array 400 is, for example, a two-dimensional antenna array. For example, the respective antenna groups in the large-scale antenna array 400 may be sequentially arranged along the Y direction, and the respective antennas in the antenna group may be arranged along the X direction. In an embodiment, the large-scale antenna array 400 may include at least three antenna groups.

Returning to FIG. 4, in the present embodiment, the processor 110 may first perform an intra-group calibration on each of the antenna groups of the large-scale antenna array 400. After the intra-group calibration of each of the antenna groups is completed, the processor 110 may power on each of the antenna groups of the large-scale antenna array 400 to perform an inter-group calibration on a specific antenna group.

Specifically, assuming that the antenna group to be calibrated is the m-th antenna group, in step S401, the processor 110 may set m to m=1. It should be mentioned that, in the disclosure, n represents the index of the antenna, m represents the index of the antenna group, and i represents the index of the antenna group set, wherein the definition of the antenna group set is described later.

In step S402, the processor 110 may power on the m-th antenna group and power off other antenna groups (i.e., other antenna groups except the m-th antenna group). For example, if m=1, the processor 110 may power on the antenna group 410 and power off the antenna groups 420, 430, and 440. If m=2, the processor 110 may power on the antenna group 420 and power off the antenna groups 410, 430, and 440, and so on.

In step S403, the processor 110 may perform an intra-group calibration on the m-th antenna group based on a modified REV method. Specifically, if the processor 110 is to perform an intra-group calibration on the n-th antenna in the m-th antenna group, the processor 110 may power on the n-th antenna in the m-th antenna group at a first power, and power on the other antennas in the m-th antenna group at a second power (i.e.: other antennas except the n-th antenna), wherein the second power may be the product of the first power and a real number α, wherein α>1. Accordingly, the processor 110 may improve equation (1) into the composite EFV of the m-th antenna group as shown in equation (9), wherein $\dot{E}_m$ represents the composite EFV of the m-th antenna group, $\dot{E}_m'$ represents the modified composite EFV of the m-th antenna group, $E_{0,m}$ represents the amplitude of the initial composite EFV of the m-th antenna group, $\phi_{0,m}$ represents the phase angle of the initial composite EFV of the m-th antenna group, $E_{n,m}$ represents the amplitude of the n-th antenna in the m-th antenna group (i.e.: the antenna to be calibrated), and $\phi_{n,m}$ represents the initial phase angle of the n-th antenna in the m-th antenna group.

$$\dot{E}'_m = (\alpha E_{0,m}e^{j\phi_{0,m}} - E_{n,m}e^{j\phi_{n,m}}) + E_{n,m}e^{j(\phi_{n,m}+\Delta)} = (E_{0,m}e^{j\phi_{0,m}} - E_{n,m}e^{j\phi_{n,m}}) + E_{n,m}e^{j(\phi_{n,m}+\Delta)} + (\alpha - 1)\cdot E_{0,m}e^{j\phi_{0,m}} = \dot{E}_m + (\alpha - 1)\cdot E_{0,m}e^{j\phi_{0,m}} \approx \dot{E}_m + \alpha\cdot E_{0,m}e^{j\phi_{0,m}},\ \alpha \gg 1 \tag{9}$$

The processor 110 may adjust the phase angle Δ corresponding to the n-th antenna to measure the composite EFV $\dot{E}_m'$ after each of the antennas in the m-th antenna group is powered on, so as to obtain the first solution ($k_{1,n,m}'$, $X_{1,n,m}'$) and the second solution ($k_{2,n,m}'$, $X_{2,n,m}'$) of the calibration value of the n-th antenna according to the composite EFV $\dot{E}_m'$ based on the REV method, wherein the calibration value includes the relative amplitude $k_{n,m}'=E_{n,m}/E_{0,m}$ and the relative phase angle $X_{n,m}'=\phi_{n,m}-\phi_{0,m}$ of the n-th antenna. For the n-th antenna of the m-th antenna group of the large-scale antenna array 400, assuming that the probability that the second solution ($k_{2,n,m}$, $X_{2,n,m}$) obtained according to the composite EFV $\dot{E}_m$ similar to equation (1) is a positive solution is $P_{\alpha,n,m}$, and the probability that the second solution ($k_{2,n,m}'$, $X_{2,n,m}'$) obtained according to the composite EFV $\dot{E}_m'$ of equation (9) is a positive solution is $P_{\alpha,n,m}'$, then $P_{\alpha,n,m}' \ll P_{\alpha,n,m}$. Accordingly, the processor 110 may directly select the first solution ($k_{1,n,m}'$, $X_{1,n,m}'$) as a positive solution from the first solution ($k_{1,n,m}'$,$X_{1,n,m}'$) and the second solution ($k_{2,n,m}'$, $X_{2,n,m}'$), and then calibrate the n-th antenna in the m-th antenna group according to the first solution ($k_{1,n,m}'$, $X_{1,n,m}'$). Compared with the traditional REV method, the calibration method of the disclosure does not need to verify whether the second solution ($k_{2,n,m}'$, $X_{2,n,m}'$) is a positive solution.

If the ratio $E_{0,m}/E_{n,m}$ of the amplitude $E_{0,m}$ of the initial composite EFV of the m-th antenna group to the amplitude $E_{n,m}$ of the n-th antenna (i.e.: the antenna to be calibrated) in the m-th antenna group is larger, the probability $P_{\alpha,n,m}'$ that the second solution ($k_{2,n,m}'$,$X_{2,n,m}'$) is a positive solution is lower. Therefore, the greater the number of antennas in the m-th antenna group, the more accurate the calibration result produced by the calibration method of the disclosure.

If the value of the real number $\alpha$ is larger, the probability $P_{\alpha,n,m}'$ that the second solution ($k_{2,n,m}'$, $X_{2,n,m}'$) is a positive solution is lower. In order to obtain an accurate calibration result, the real number $\alpha$ needs to satisfy $\alpha \geq 2$ or $N \leq \alpha \leq N^2$, wherein N is the total number of antennas in the m-th antenna group.

Figure 5:
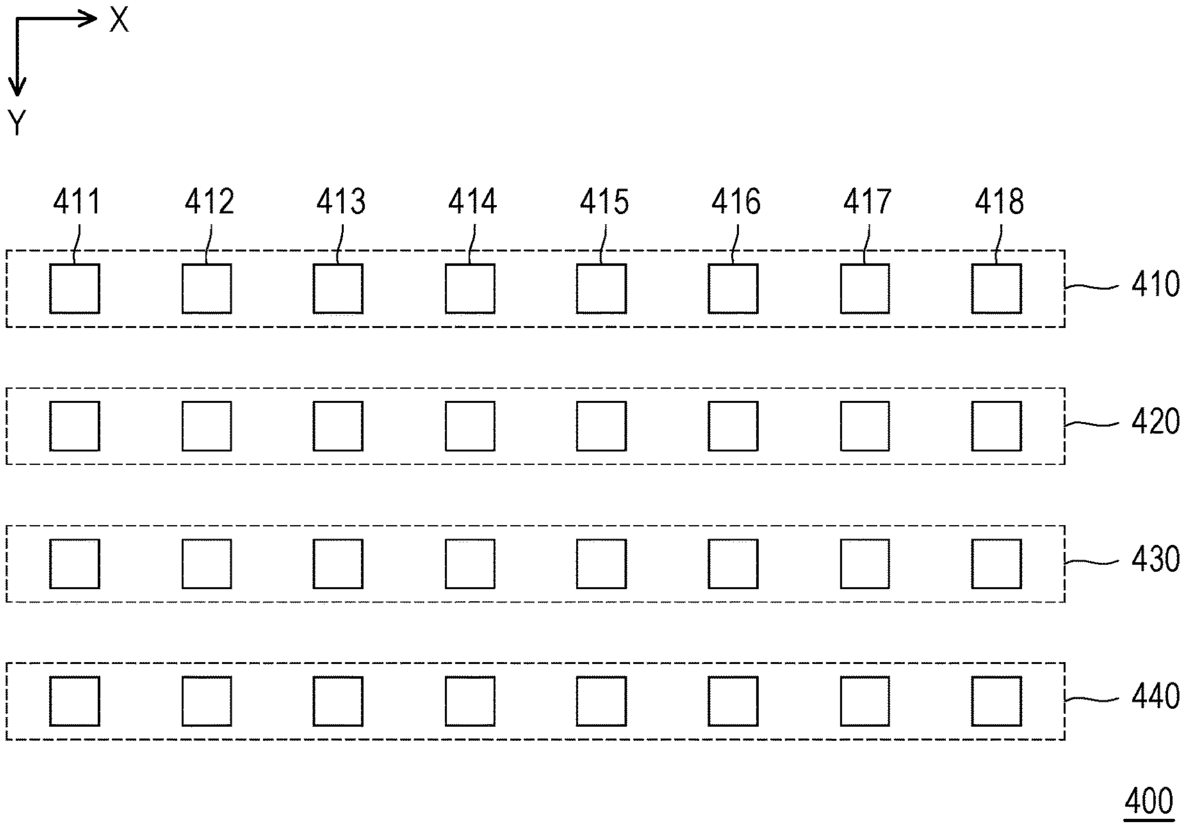
FIG. 5 is a schematic diagram of a large-scale antenna array shown according to an embodiment of the disclosure.

Taking FIG. 5 as an example, it is assumed that the processor 110 is to perform an intra-group calibration on the antenna 411 in the antenna group 410. The processor 110 may power on the antenna 411 at a first power, and power on the antenna 412 to the antenna 418 at a second power, wherein the second power may be the product of the first power and the real number $\alpha$, and is $\alpha \geq 1$. The processor 110 may obtain the first solution ($k_{1,411,410}'$, $X_{1,411,410}'$) and the second solution ($k_{2,411,410}'$, $X_{2,411,410}'$) of the calibration value of the antenna 411 according to equation (10), and may calibrate the antenna 411 according to the first solution ($k_{1,411,410}'$, $X_{1,411,410}'$), wherein $E_{410}$ represents the composite EFV of the antenna group 410, $\dot{E}_{410}'$ represents the improved composite EFV of the antenna group 410, $E_{0,410}$ represents the amplitude of the initial composite EFV of the antenna group 410, and $\phi_{0,410}$ represents the phase angle of the initial composite EFV of the antenna group 410.

$$\dot{E}_{410}' \approx \dot{E}_{410} + \alpha \cdot E_{0,410} e^{j\phi_{0,410}} \tag{10}$$

Figure 6A:
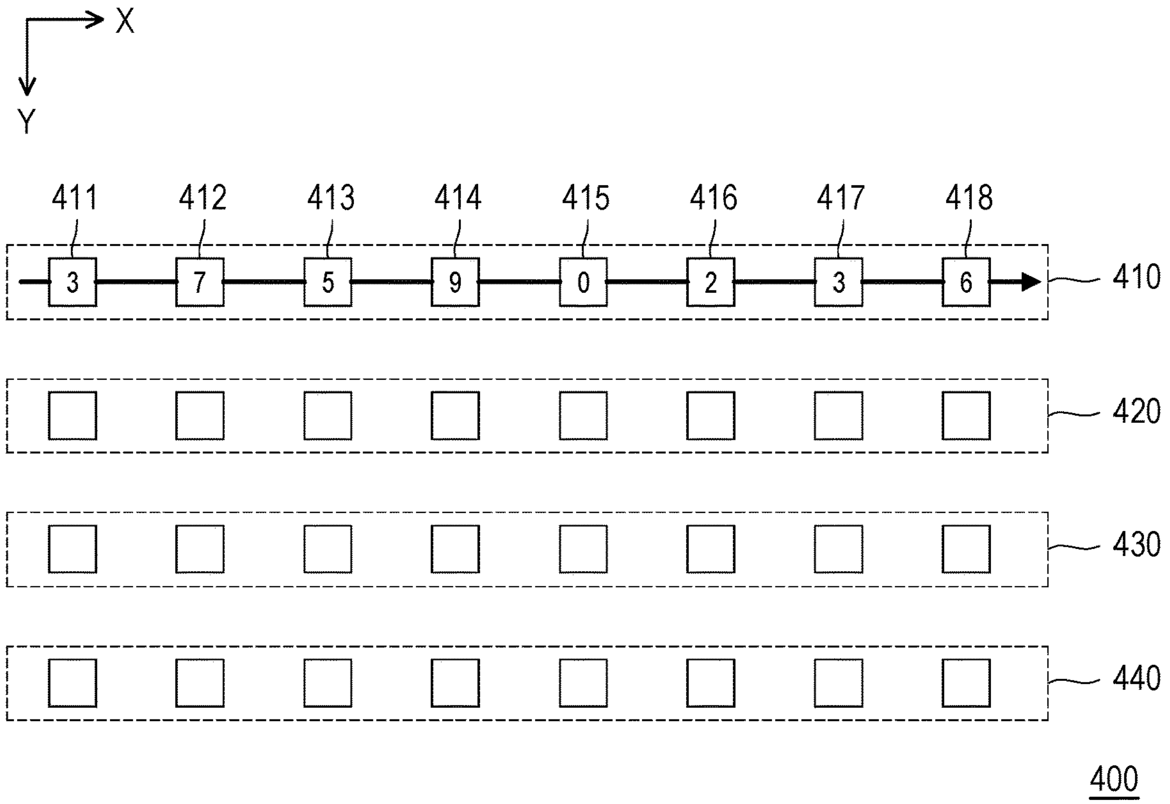
FIG. 6A is a schematic diagram of performing an intra-group calibration on an antenna group 410 shown according to an embodiment of the disclosure.

Moreover, it is assumed that the processor 110 is to calibrate the antenna 412 in the antenna group 410. The processor 110 may power on the antenna 412 at the first power and power on the antenna 411 (or the calibrated antenna 411) and the antenna 413 to the antenna 418 at the second power, wherein the second power may be the product of the first power and the real number $\alpha$, and is $\alpha \geq 1$. The processor 110 may obtain the first solution ($k_{1,412,410}'$, $X_{1,412,410}'$) and the second solution ($k_{2,412,410}'$, $X_{2,412,410}'$) of the calibration value of the antenna 412 according to equation (10), and may calibrate the antenna 412 according to the first solution ($k_{1,412,410}'$, $X_{1,412,410}'$). By analogy, the processor 110 may sequentially perform an intra-group calibration on the plurality of antennas in the antenna group 410, as shown in FIG. 6A. In FIG. 6A, in the antenna group 410, the number in each of the antennas represents the phase angle offset that needs to be adjusted to calibrate the antenna. In the present embodiment, the phase angle of each of the antennas is represented by 6 bits, so the maximum value of the phase angle offset is 64, and the minimum value thereof is 1.

Figure 6B:
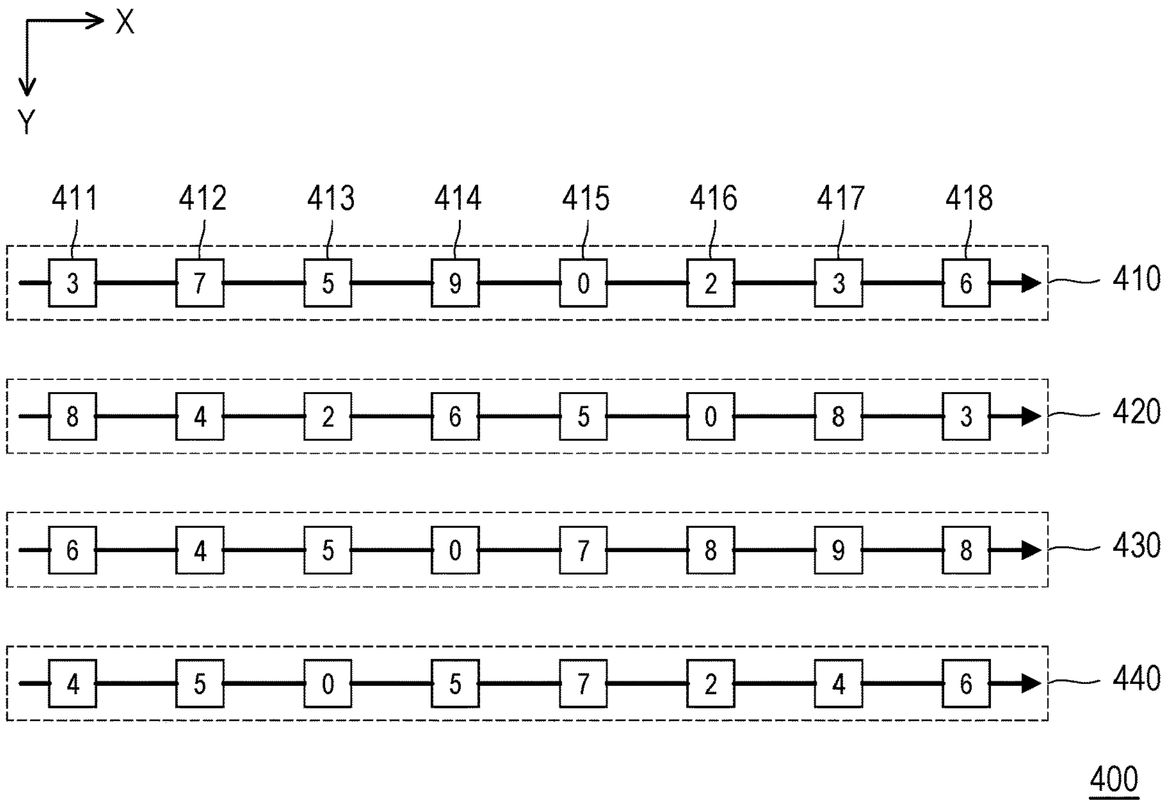
FIG. 6B is a schematic diagram of all intra-group calibrated antenna groups shown according to an embodiment of the disclosure.

In step S404, the processor 110 may determine whether each of the antenna groups in the large-scale antenna array 400 is intra-group calibrated. If all of the antenna groups are intra-group calibrated, step S405 is performed. If there are still antenna groups that are not intra-group calibrated, the processor 110 sets m=m+1, and performs step S402 again. After repeating the process from step S402 to step S404, the processor 110 may sequentially complete the intra-group calibration of the antenna groups 410, 420, 430, and 440, as shown in FIG. 6B.

In step S405, the processor 110 may power on all of the antenna groups of the large-scale antenna array 400, including the antenna groups 410, 420, 430, and 440.

In step S406, the processor 110 may sequentially perform an inter-group calibration on each of the antenna groups (i.e., the antenna groups 410, 420, 430, and 440) of the large-scale antenna array 400 based on the modified REV method. Specifically, if the processor 110 is to perform an inter-group calibration on the m-th antenna group, the processor 110 may power on the m-th antenna group in the large-scale antenna array 400 at a first power, and power on the other antenna groups in the large-scale antenna array 400 at a second power (i.e.: other antenna groups except the m-th antenna group), wherein the second power may be the product of the first power and a real number $\alpha$, wherein $\alpha > 1$. Accordingly, the processor 110 may improve equation (1) into the composite EFV of the large-scale antenna array 400 as shown in equation (11), wherein $\dot{E}$ represents the composite EFV of all of the antenna groups in the large-scale antenna array 400, $\dot{E}'$ represents the modified composite EFV of all of the antenna groups in the large-scale antenna array 400, $E_0$ represents the amplitude of the initial composite EFV of all of the antenna groups in the large-scale antenna array 400, $\phi_0$ represents the phase angle of the initial composite EFV of all of the antenna groups in the large-scale antenna array 400, $E_m$ represents the amplitude of the m-th antenna group (i.e.: the antenna group to be calibrated), and $\phi_m$ represents the initial phase angle of the m-th antenna group.

$$\begin{aligned} \dot{E}' &= (\alpha E_0 e^{j\phi_0} - E_m e^{j\phi_m}) + E_m e^{j(\phi_m+\Delta)} = \\ &(E_0 e^{j\phi_0} - E_m e^{j\phi_m}) + E_m e^{j(\phi_m+\Delta)} + (\alpha - 1)\cdot E_0 e^{j\phi_0} = \\ &\dot{E} + (\alpha - 1)\cdot E_0 e^{j\phi_0} \approx \dot{E} + \alpha \cdot E_0 e^{j\phi_0},\ \alpha \gg 1 \end{aligned} \tag{11}$$

The processor 110 may adjust the phase angle $\Delta$ corresponding to the m-th antenna group to measure the composite EFV $\dot{E}'$ after each of the antenna groups in the large-scale antenna array 400 is powered on, so as to obtain the first solution ($k_{1,m}'$, $X_{1,m}'$) and the second solution ($k_{2,m}'$, $X_{2,m}'$) of the calibration value of the m-th antenna group according to the composite EFV $\dot{E}'$ based on the REV method, wherein the calibration value includes the relative amplitude $k_m' = E_m/E_0$ and the relative phase angle $X_m' = \phi_m/\phi_0$ of the m-th antenna group. For the m-th antenna group of the large-scale antenna array 400, assuming that the probability that the second solution ($k_{2,m}$, $X_{2,m}$) obtained according to the composite EFV E similar to equation (1) is a positive solution is $P_{\alpha,m}$, and the probability that the second solution ($k_{2,m}'$, $X_{2,m}'$) obtained according to the composite EFV $\dot{E}'$ of equation (11) is a positive solution is $P_{\alpha,m}'$, $P_{\alpha,m}' \ll P_{\alpha,m}$. Accordingly, the processor 110 may directly select the first solution ($k_{1,m}'$, $X_{1,m}'$) as a positive solution from the first solution ($k_{1,m}'$, $X_{1,m}'$) and the second solution ($k_{2,m}'$, $X_{2,m}'$), and then calibrate the m-th antenna group according to the first solution ($k_{1,m}'$, $X_{1,m}'$). Compared with the traditional REV method, the calibration method of the disclosure does not need to verify whether the second solution ($k_{2,m}'$, $X_{2,m}'$) is a positive solution.

If the ratio $E_0/E_m$ of the amplitude $E_0$ of the initial composite EFV of the large-scale antenna array 400 to the amplitude $E_m$ of the m-th antenna group (i.e.: the antenna group to be calibrated) is larger, the probability $P_{\alpha,m}'$ that the second solution ($k_{2,m}'$, $X_{2,m}'$) is a positive solution is lower. Therefore, the larger the number of antenna groups in the large-scale antenna array 400, the more accurate the calibration result produced by the calibration method of the disclosure.

If the value of the real number $\alpha$ is larger, the probability $P_{\alpha,m}'$ that the second solution ($k_{2,m}'$, $X_{2,m}'$) is a positive solution is lower. In order to obtain an accurate calibration result, the real number $\alpha$ needs to satisfy $\alpha \geq 2$ or $M \leq \alpha \leq M^2$, wherein M is the total number of antenna groups in the large-scale antenna array 40.

Taking FIG. 5 as an example, it is assumed that the processor 110 is to perform an inter-group calibration on the antenna group 410 in the large-scale antenna array 400. The processor 110 may power on the antenna group 410 at a first power, and power on the antenna group 420 to the antenna 440 at a second power, wherein the second power may be the product of the first power and the real number α, and α>1. The processor 110 may obtain the first solution ($k_{1,410}'$, $X_{1,410}'$) and the second solution ($k_{2,410}'$, $X_{2,410}'$) of the calibration value of the antenna group 410 according to equation (12), and may calibrate the antenna group 410 according to the first solution ($k_{1,410}'$, $X_{1,410}'$), wherein $\dot{E}_{400}$ represents the composite EFV of all of the antenna groups in the large-scale antenna array 400, $\dot{E}^{400'}$ represents the modified composite EFV of all of the antenna groups in the large-scale antenna array 400, $E_{0,400}$ represents the amplitude of the initial composite EFV of all of the antenna groups in the large-scale antenna array 400, and $\phi_{0,400}$ represents the phase angle of the initial composite EFV of all of the antenna groups in the large-scale antenna array 400.

$$\dot{E}_{400}' \approx \dot{E}_{400} + \alpha \cdot E_{0,400} e^{j\phi_{0,400}} \quad (12)$$

Figure 6C:
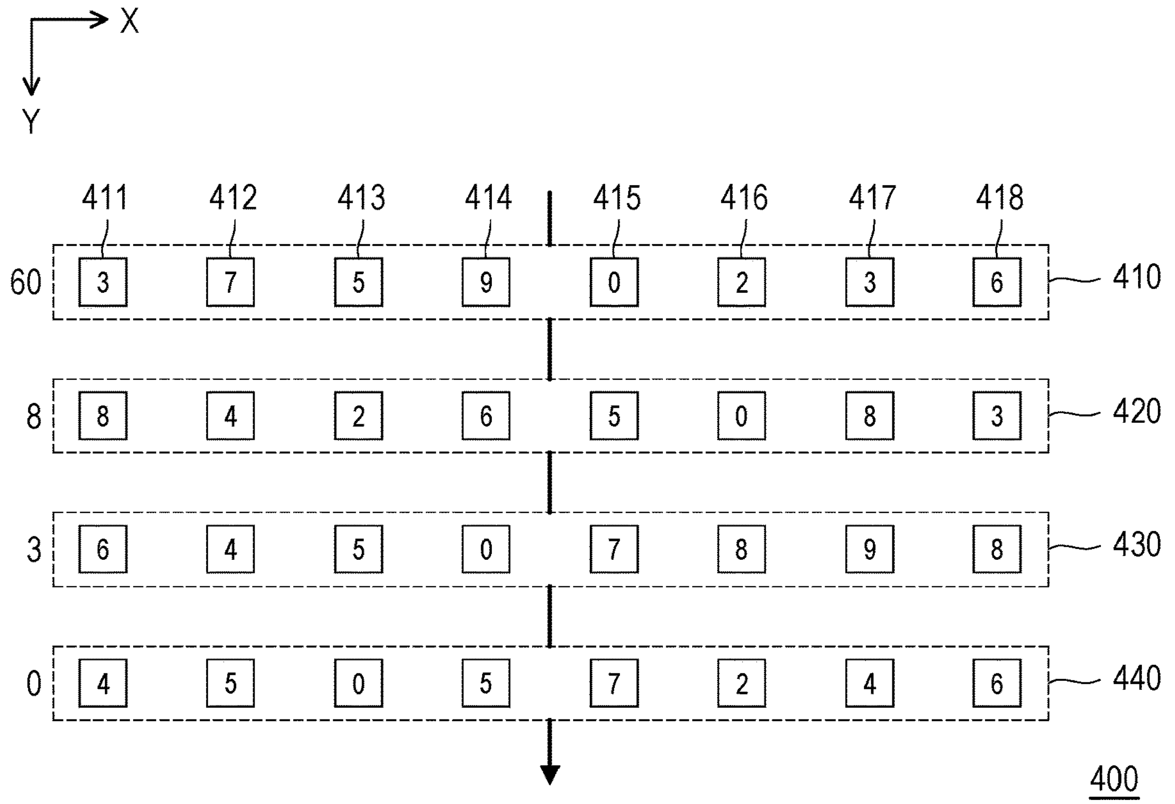
FIG. 6C is a schematic diagram of performing an inter-group calibration on each antenna group in a large-scale antenna array 400 shown according to an embodiment of the disclosure.

Moreover, it is assumed that the processor 110 is to perform an inter-group calibration on the antenna group 420 in the large-scale antenna array 400. The processor 110 may power on the antenna group 420 at a first power, and power on the antenna group 410 and the antenna group 430 to the antenna 440 at a second power, wherein the second power may be the product of the first power and the real number α, and α>1. The processor 110 may obtain the first solution ($k_{1,420}'$, $X_{1,420}'$) and the second solution ($k_{2,420}'$, $X_{2,420}'$) of the calibration value of the antenna group 420 according to equation (12), and may calibrate the antenna group 420 according to the first solution ($k_{1,420}'$, $X_{1,420}'$). By analogy, the processor 110 may sequentially perform an inter-group calibration on a plurality of antenna groups in the large-scale antenna array 400, as shown in FIG. 6C. In FIG. 6C, numerical values 60, 8, 3, and 0 represent the adjusted phase angle offsets needed to calibrate antenna groups 410, 420, 430, and 440, respectively. In the present embodiment, the phase angle of each of the antenna groups is represented by 6 bits, so the maximum value of the phase angle offset is 64, and the minimum value thereof is 1.

Figure 6D:
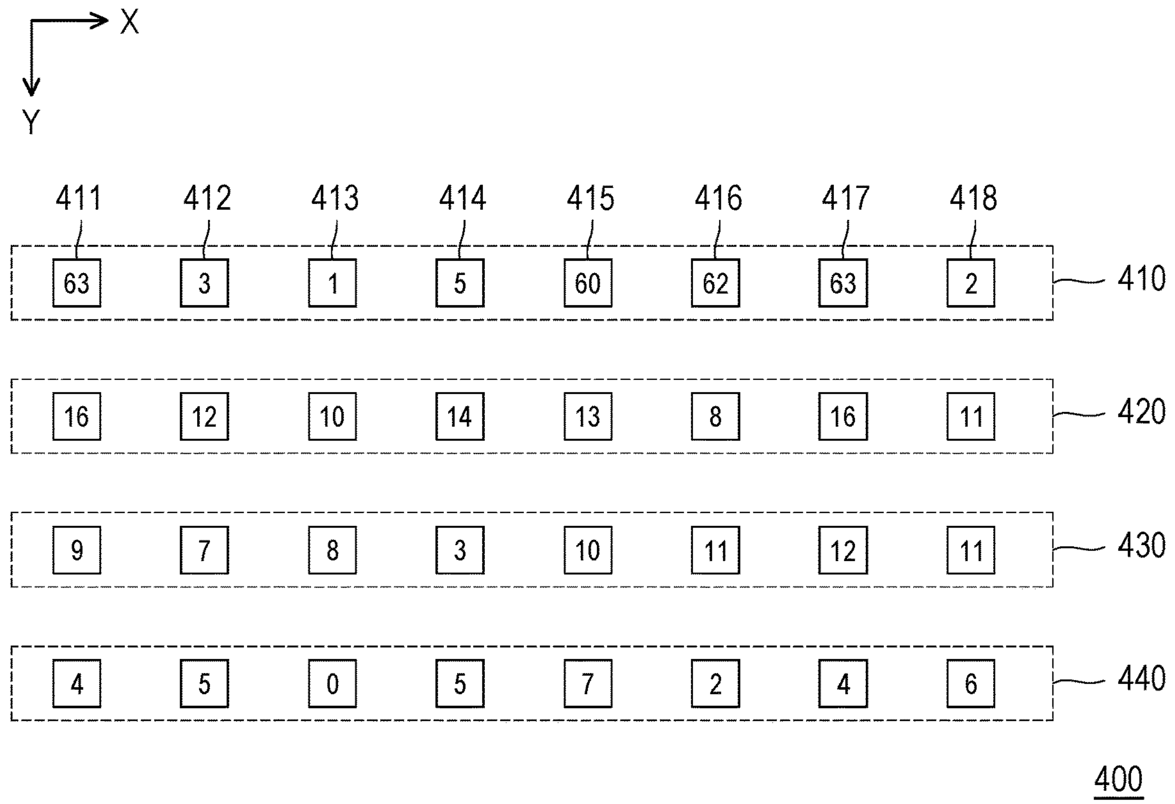
FIG. 6D is a schematic diagram of the calibrated large-scale antenna array 400 shown according to an embodiment of the disclosure.

In step S407, the processor 110 may complete the calibration of the large-scale antenna array 400 according to the results of the intra-group calibration and the inter-group calibration. FIG. 6D is a schematic diagram of a calibrated large-scale antenna array 400 shown according to an embodiment of the disclosure. Taking the antenna 412 as an example, the processor 110 may obtain a calibration value of 7 according to the result of the intra-group calibration of the antenna 412, and obtain the calibration value of 60 according to the result of the inter-group calibration of the antenna group 410. The processor 110 may add the calibration value 7 and the calibration value 60 to calculate the desired final adjusted phase angle offset of the antenna 412 to be 67. Since the phase angle of the antenna 412 is represented by 6 bits, the processor 110 may calculate the calibration value 3 by subtracting 64 from 67 (i.e., 360 degrees).

Figure 7:
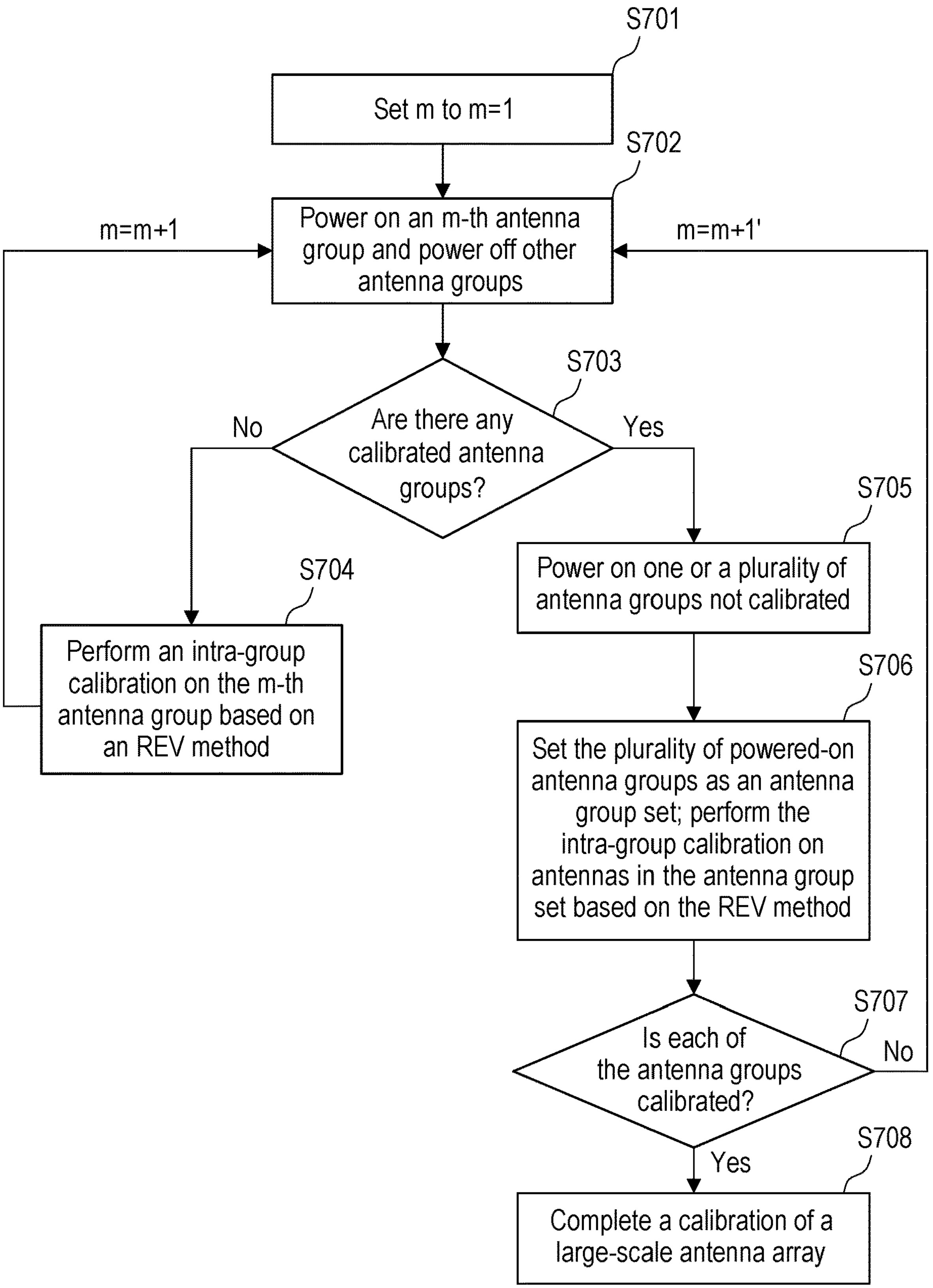
FIG. 7 is a flowchart of a calibration method for a large-scale antenna array shown according to an embodiment of the disclosure.

FIG. 7 is a flowchart of a calibration method for a large-scale antenna array shown according to an embodiment of the disclosure, wherein the calibration method may be implemented by the calibration device 100 shown in FIG. 3. The calibration method is used to calibrate the large-scale antenna array 400 shown in FIG. 5. In the present embodiment, the processor may first perform an intra-group calibration on an antenna group of the large-scale antenna array 400. Next, the processor 110 may set a calibrated antenna group and an uncalibrated antenna group as an antenna group set. The processor 110 may power on all of the antenna groups in the of antenna group set to perform an intra-group calibration on antenna groups that are not calibrated.

Specifically, assuming that the antenna group to be calibrated is the m-th antenna group, in step S701, the processor 110 may set m to m=1.

In step S702, the processor 110 may power on the m-th antenna group and power off other antenna groups (i.e., other antenna groups except the m-th antenna group). For example, if m=1, the processor 110 may power on the antenna group 410 and power off the antenna groups 420, 430, and 440. If m=2, the processor 110 may power on the antenna group 420 and power off the antenna groups 410, 430, and 440, and so on.

In step S703, the processor 110 may determine whether there are any calibrated antenna groups in the large-scale antenna array 400. If the processor 110 determines that one or a plurality of calibrated antenna groups exist, step S705 is performed. If the processor 110 determines that none of the antenna groups are calibrated, step S704 is performed. Specifically, when m=1, the antenna group 410 in the large-scale antenna array 400 is the antenna group to be calibrated, and the antenna groups 420, 430, and 440 are the antenna groups not calibrated. Therefore, the processor 110 chooses to perform step S704.

In step S704, the processor 110 performs an intra-group calibration corresponding to the m-th antenna group on the m-th antenna group based on a modified REV method. The method of intra-group calibration is similar to that of step S403 of FIG. 4, and is therefore not repeated herein. The processor 110 may complete the intra-group calibration for the antenna group 410 corresponding to m=1 of step S704.

In step S705, the processor 110 may power on one or a plurality of antenna groups in the large-scale antenna array 400 not calibrated. For example, if m=2, the processor 110 may power on the antenna group 410 in step S702 and power on the antenna group 420 in step S705. The antenna group 430 and the antenna group 440 are still in a power off state. If m=3, the processor 110 may power on the antenna group 430 in step S702, and power on the antenna group 410 and the antenna group 420 in step S705. The antenna group 440 is still in a power off state.

In step S706, the processor 110 may set the plurality of powered on antenna groups as an antenna group set (or referred to as antenna group set i). Next, the processor 110 may perform an intra-group calibration corresponding to the antenna group set i on the n-th (n=1 to N) antenna in the antenna group set i based on the REV method, wherein N is the total number of antennas in the m-th antenna group. That is, the processor 110 may perform an intra-group calibration for all of the antennas in the antenna group set i based on the REV method, respectively. Specifically, if the processor 110 is to perform an intra-group calibration on the n-th antenna in the antenna group set i, the processor 110 may power on the n-th antenna in the antenna group set i at a first power, and power on the other antennas in the antenna group set i at a second power (i.e.: other antennas except the n-th antenna), wherein the second power may be the product of the first power and a real number α, wherein α>1. Accordingly, the processor 110 may improve equation (1) into the composite EFV of the antenna group set i as shown in equation (13), wherein $\dot{E}_i$ represents the composite EFV of the antenna group set i, $\dot{E}_i'$ represents the modified composite EFV of the antenna group set i, $E_0$,i represents the amplitude of the initial composite EFV of the antenna group set i, $\phi_{0,i}$ represents the phase angle of the initial composite EFV of the antenna group set i, $E_{n,i}$ represents the amplitude of the n-th antenna in the antenna group set i (i.e.: the antenna to be calibrated), and $\phi_{n,i}$ represents the initial phase angle of the n-th antenna in the antenna group set i.

$$\dot{E}_i' = (\alpha E_{0,i}e^{j\phi_{0,i}} - E_{n,i}e^{j\phi_{n,i}}) + E_{n,i}e^{j(\phi_{n,i}+\Delta)} = (E_{0,i}e^{j\phi_{0,i}} - E_{n,i}e^{j\phi_{n,i}}) + E_{n,i}e^{j(\phi_{n,i}+\Delta)} + (\alpha-1)\cdot E_{0,i}e^{j\phi_{0,i}} = \dot{E}_i + (\alpha-1)\cdot E_{0,i}e^{j\phi_{0,i}} \approx \dot{E}_i + \alpha\cdot E_{0,i}e^{j\phi_{0,i}},\ \alpha \gg 1 \quad (13)$$

The processor 110 may adjust the phase angle Δ corresponding to the n-th antenna to measure the composite EFV $\dot{E}_i'$ after each of the antennas in the antenna group set i is powered on, so as to obtain the first solution ($k_{1,n,i}'$, $X_{1,n,i}'$) and the second solution ($k_{2,n,i}'$,$X_{2,n,i}'$) of the calibration value of the n-th antenna according to the composite EFV $\dot{E}_i'$ based on the REV method, wherein the calibration value includes the relative amplitude $k_{n,i}'=E_{n,i}/E_{0,i}$ and the relative phase angle $X_{n,i}'=\phi_{n,i}-\phi_{0,i}$ of the n-th antenna. For the n-th antenna in the antenna group set i of the large-scale antenna array 400, assuming that the probability that the second solution ($k_{2,n,i}$, $X_{2,n,i}$) obtained according to the composite EFV $\dot{E}_i$ similar to equation (1) is a positive solution is $P_{\alpha,n,i}$, and the probability that the second solution ($k_{2,n,i}'$, $X_{2,n,i}'$) obtained according to the composite EFV $\dot{E}_i'$ of equation (13) is a positive solution is $P_{\alpha,n,i}$'$P_{\alpha,n,i}' \ll P_{\alpha,n,i}$. Accordingly, the processor 110 may directly select the first solution ($k_{1,n,i}'$,$X_{1,n,i}'$) from the first solution ($k_{1,n,i}'$,$X_{1,n,i}'$) and the second solution ($k_{2,n,i}'$, $X_{2,n,i}'$) as a positive solution, and then calibrate the n-th antenna in the antenna group set i according to the first solution ($k_{1,n,i}'$, $X_{1,n,i}'$). Compared with the traditional REV method, the calibration method of the disclosure does not need to verify whether the second solution ($k_{2,n,i}'$, $X_{2,n,i}'$) is a positive solution.

If the ratio $E_{0,i}/E_{n,i}$ of the amplitude $E_{0,i}$ of the initial composite EFV of the antenna group set i to the amplitude $E_{n,i}$ of the n-th antenna (i.e.: the antenna to be calibrated) in the antenna group set i is larger, the probability $P_{\alpha,n,i}'$ that the second solution ($k_{2,n,i}'$, $X_{2,n,i}'$) is a positive solution is lower. Therefore, the greater the number of antennas in the antenna group set i, the more accurate the calibration result produced by the calibration method of the disclosure.

If the value of the real number α is larger, the probability $P_{\alpha,n,i}'$ that the second solution ($k_{2,n,i}'$, $X_{2,n,i}'$) is a positive solution is lower. In order to obtain an accurate calibration result, the real number α needs to satisfy $\alpha \geq 2$ or $N \leq \alpha \leq N^2$, wherein N is the total number of antennas in antenna group set i.

Figure 8A:
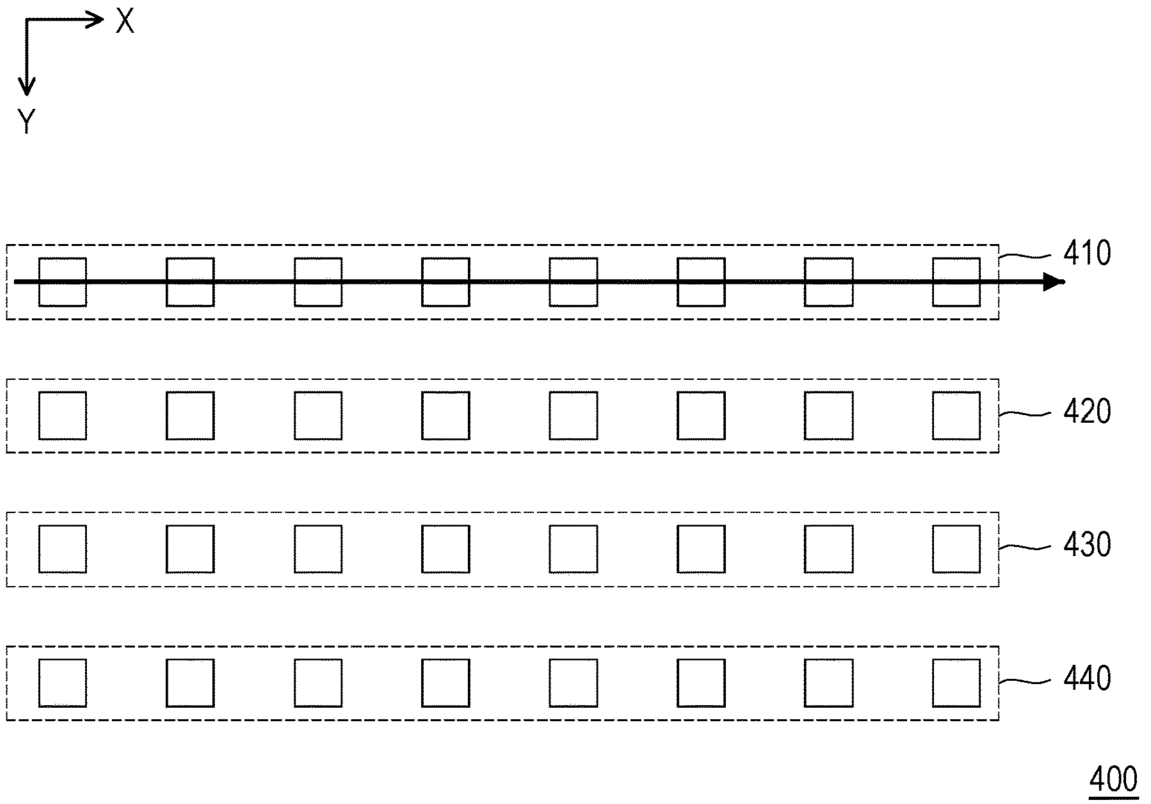
FIG. 8A is a schematic diagram of performing an intra-group calibration on the antenna group 410 shown according to an embodiment of the disclosure.
Figure 8B:
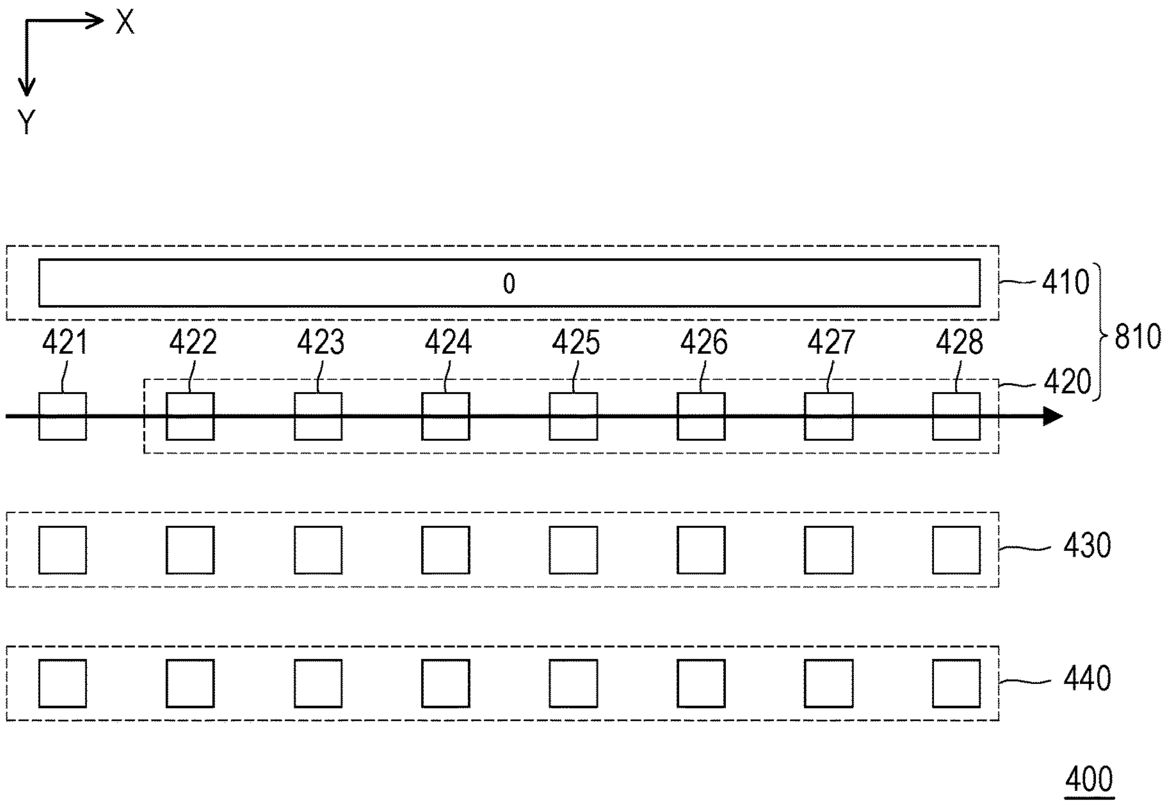
FIG. 8B is a schematic diagram of performing an intra-group calibration and an inter-group calibration simultaneously on an antenna group 421 shown according to an embodiment of the disclosure.

FIG. 8B is a schematic diagram of performing an intra-group calibration and an inter-group calibration simultaneously on an antenna group 421 shown according to an embodiment of the disclosure. It is assumed that the antenna group 420 includes antennas 421, 422, 423, 424, 425, 426, 427, and 428, the intra-group calibration of the antenna group 410 is completed, and the processor 110 is to perform an intra-group calibration and an inter-group calibration simultaneously on the antennas 421 in the antenna group set 810, wherein the antenna group set 810 includes the antenna group 410 and the antenna group 420. The processor 110 may power on the antenna 421 in the antenna group set 810 at a first power, and power on all of the antennas in the antenna group 410 and the antenna 422 to the antenna 428 in the antenna group 420 at a second power, wherein the second power may be the product of the first power and a real number α, and $\alpha \geq 1$. The processor 110 may obtain the first solution ($k_{1,421,810}'$, $X_{1,421,810}'$) and the second solution ($k_{2,421,810}'$, $X_{2,421,810}'$) of the calibration value of the antenna 421 according to equation (14), and may calibrate the antenna 421 according to the first solution ($k_{1,421,810}'$, $X_{1,421,810}$), wherein $E_{810}$ represents the composite EFV of the antenna group set 810, $\dot{E}_{810}'$ represents the improved composite EFV of the antenna group set 810, $\dot{E}_{810}'$ represents the amplitude of the initial composite EFV of the antenna group set 810, and $\phi_{0,810}$ represents the phase angle of the initial composite EFV of the antenna group set 810.

$$\dot{E}_{810}' \approx \dot{E}_{810} + \alpha\cdot E_{0,810}e^{j\phi_{0,810}} \quad (14)$$

Figure 8C:
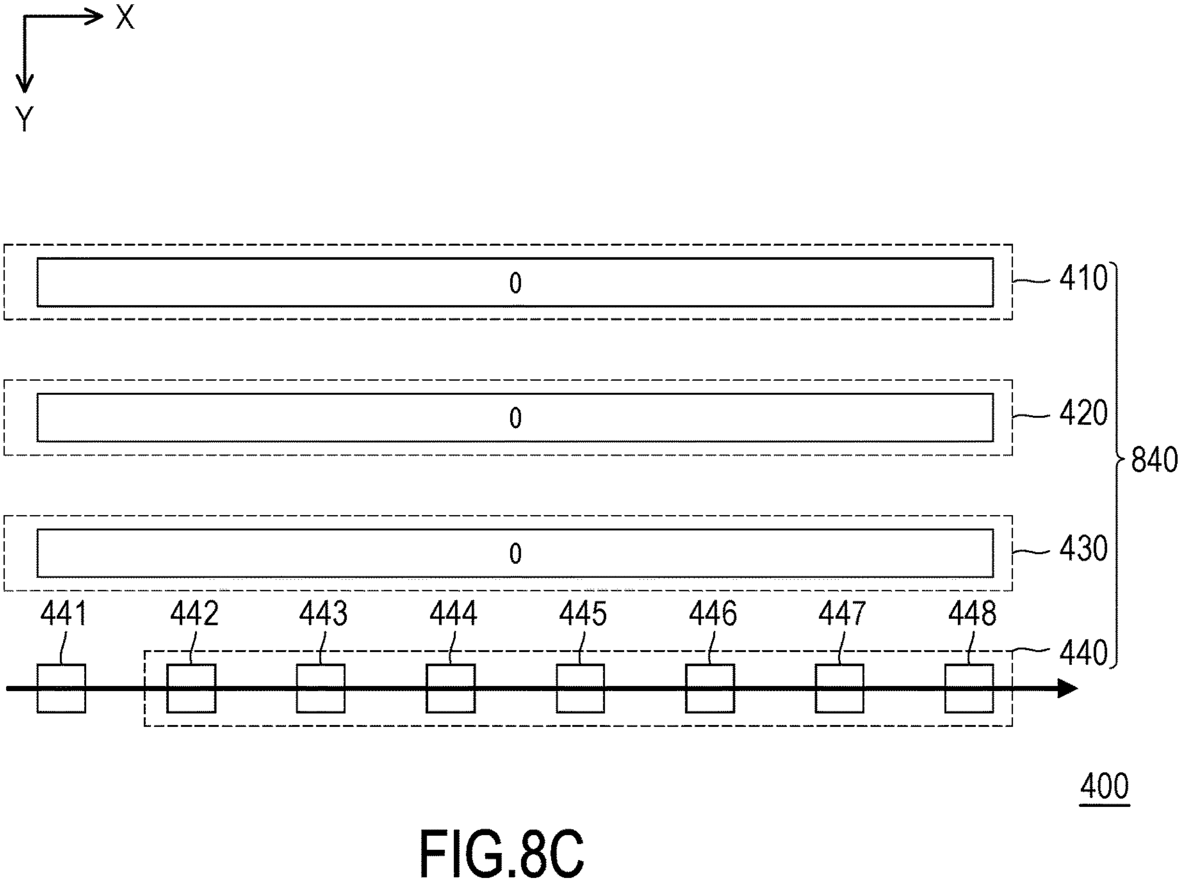
FIG. 8C is a schematic diagram of performing an intra-group calibration and an inter-group calibration simultaneously on an antenna group 441 shown according to an embodiment of the disclosure.

FIG. 8C is a schematic diagram of performing an intra-group calibration and an inter-group calibration simultaneously on an antenna group 441 shown according to an embodiment of the disclosure. It is assumed that the antenna group 440 includes antennas 441, 442, 443, 444, 445, 446, 447, and 448, the calibration (i.e.: intra-group calibration and inter-group calibration) of the antenna groups 410, 420, and 430 is completed, and the processor 110 is to perform an intra-group calibration and an inter-group calibration simultaneously on the antenna 441 in an antenna group set 840, and the antenna group set 840 includes the antenna groups 410, 420, 430, and 440. The processor 110 may power on the antenna 441 in the antenna group set 840 at a first power, and power on all of the antennas in the antenna groups 410, 420, and 430 and the antenna 442 to the antenna 448 in the antenna group 440 at a second power, wherein the second power may be the product of the first power and a real number α, and $\alpha > 1$. The processor 110 may obtain the first solution ($k_{1,441,840}'$,$X_{1,441,840}'$) and the second solution ($k_{2,441,840}'$, $X_{2,441,840}'$) of the calibration value of the antenna 441 according to equation (15), and may calibrate the antenna 441 according to the first solution ($k_{1,441,840}'$, $X_{441,840}'$), wherein $\dot{E}_{840}$ represents the composite EFV of the antenna group set 840, $\dot{E}_{840}'$ represents the improved composite EFV of the antenna group set 840, $E_{0,840}$ represents the amplitude of the initial composite EFV of the antenna group set 840, and $\phi_{0,840}$ represents the phase angle of the initial composite EFV of the antenna group set 840.

$$\dot{E}_{840}' \approx \dot{E}_{840} + \alpha\cdot E_{0,840}e^{j\phi_{0,840}} \quad (15)$$

In step S707, the processor 110 may determine whether each of the antenna groups in the large-scale antenna array 400 is calibrated. If all of the antenna groups are calibrated, step S407 is performed. If there are still antenna groups that are not calibrated, the processor 110 sets m=m+1, and performs step S702 again. In step S708, the processor 110 may complete the calibration of the large-scale antenna array 400.

Figure 9:
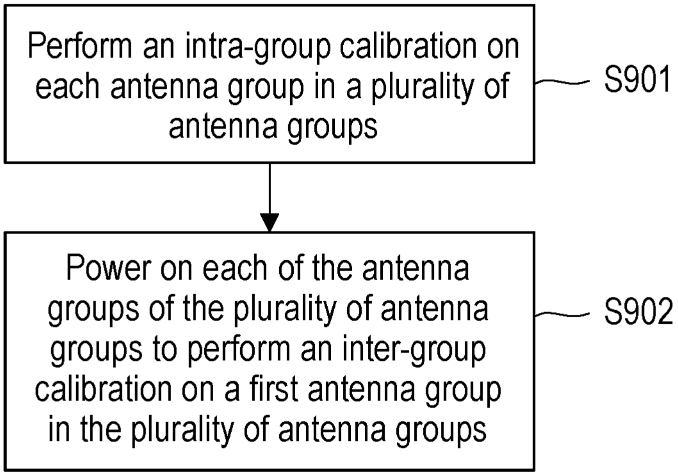
FIG. 9 is a flowchart of a calibration method for a large-scale antenna array shown according to an embodiment of the disclosure.

FIG. 9 is a flowchart of a calibration method for a large-scale antenna array shown according to an embodiment of the disclosure, wherein the method may be implemented by the calibration device 100 shown in FIG. 3. It is assumed the large-scale antenna array includes a plurality of antenna groups. In step S901, an intra-group calibration is performed on each of the plurality of antenna groups. In step S902, each of the antenna groups of the plurality of antenna groups is powered on to perform an inter-group calibration on the first antenna group in the plurality of antenna groups.

Figure 10:
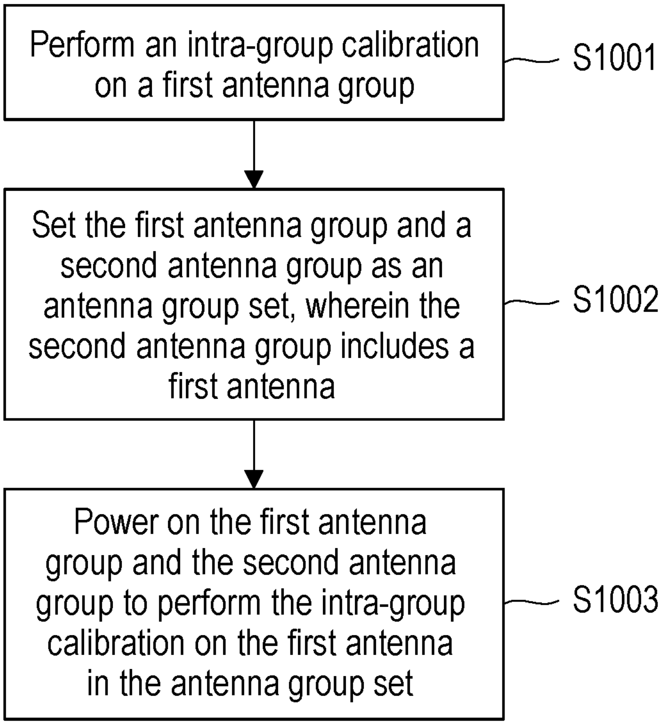
FIG. 10 is a flowchart of a calibration method for another large-scale antenna array shown according to an embodiment of the disclosure.

FIG. 10 is a flowchart of a calibration method of another large-scale antenna array shown according to an embodiment of the disclosure, wherein the method may be implemented by the calibration device 100 shown in FIG. 3. It is assumed the large-scale antenna array includes a first antenna group and a second antenna group. In step S1001, an intra-group calibration is performed on the first antenna group. In step S1002, the first antenna group and the second antenna group are set as an antenna group set, wherein the second antenna group includes the first antenna. In step S1003, the first antenna group and the second antenna group are powered on to perform an intra-group calibration on the first antenna in the antenna group set.

Based on the above, the calibration device of the disclosure may divide a plurality of antenna areas in a large-scale antenna array into several antenna groups, and sequentially perform an intra-group calibration and an inter-group calibration on each of the antenna groups. Compared with the traditional way of performing calibration on each of the antennas sequentially, the calibration device of the disclosure may reduce a large amount of computation using the inter-group calibration, thereby speeding up the calibration speed of the large-scale antenna array. In addition, the calibration device of the disclosure may simultaneously perform the intra-group calibration and the inter-group calibration for one antenna. When the calibration device performs the inter-group calibration for each of the antennas, the intra-group calibration between different antenna groups is also performed at the same time. Moreover, the disclosure also provides an improved REV method enabling the calibration device to readily determine a positive solution from a plurality of solutions of the REV method. Therefore, the calibration device does not need to spend a lot of time and computation in verifying the positive solution of the REV method. The traditional REV method may have issues such as the difficulty in determining the calibration result and the combined power of the antenna array being less than that of a single antenna, resulting in an offset of the phase angle estimated by the algorithm. The disclosure may solve the above issues by powering on all the antennas of the antenna array and accumulating the energy of the antennas to complete the calibration of the antenna array. The disclosure may also improve the accuracy of estimating the phase angle by taking the complex phase angle after the ratio operation.

What is claimed is:

1. A calibration method for a large-scale antenna array, wherein the large-scale antenna array comprises a plurality of antenna groups, wherein the calibration method comprises:

performing an intra-group calibration on each of the antenna groups in the plurality of antenna groups; and powering on each of the antenna groups of the plurality of antenna groups to perform an inter-group calibration on a first antenna group in the plurality of antenna groups based on a first rotating element electric field vector method, comprising:

powering on the first antenna group in the plurality of antenna groups at a first power and powering on other antenna groups in the plurality of antenna groups at a second power, wherein the second power is a product of the first power and a first real number, wherein the first real number is greater than one;

adjusting a first phase angle of the first antenna group to measure a first composite electric field (EFV) of the plurality of antenna groups after the first antenna group and the other antenna groups are powered on; and obtaining a first solution and a second solution corresponding to a first calibration value of the first antenna group according to the first composite EFV based on the first rotating element electric field vector method.

2. The calibration method of claim 1, further comprising: performing the intra-group calibration based on a second rotating element electric field vector method.

3. The calibration method of claim 2, wherein the step of performing the intra-group calibration based on the second rotating element electric field vector method comprises:

performing the intra-group calibration on the first antenna group, comprising:

powering on a first antenna in the first antenna group at a third power, and powering on other antennas in the first antenna group at a fourth power, wherein the fourth power is a product of the third power and a second real number, wherein the second real number is greater than one;

adjusting a second phase angle of the first antenna to measure a second composite EFV of the first antenna group after the first antenna and the other antennas are powered on; and obtaining a third solution and a fourth solution corresponding to a second calibration value of the first antenna according to the second composite EFV based on the second rotating element electric field vector method.

4. The calibration method of claim 3, wherein the step of performing the intra-group calibration on the first antenna group further comprises:

selecting the third solution from the third solution and the fourth solution to calibrate the first antenna, wherein the third solution satisfies the following equation:

$$Y > k'_{n,m},\ k'_{n,m} = \frac{E_{n,m}}{E_{0,m}},\ Y^2 = (\cos X'_{n,m} - k'_{n,m})^2 + \sin^2 X'_{n,m},\ X'_{n,m} = \phi_{n,m} - \phi_{0,m}$$

wherein $E_{n,m}$ is an amplitude of the first antenna, $E_{0,m}$ is an amplitude of an initial composite EFV of the first antenna group, $\phi_{n,m}$ is an initial phase angle of the first antenna, and $\phi_{0,m}$ is a phase angle of the initial composite EFV.

5. The calibration method of claim 1, wherein the step of performing the inter-group calibration based on the first rotating element electric field vector method further comprises:

selecting the first solution from the first solution and the second solution to calibrate the first antenna group, wherein the first solution satisfies the following equation:

$$Y > k'_m,\ k'_m = \frac{E_m}{E_0},\ Y^2 = (\cos X'_m - k'_m)^2 + \sin^2 X'_m,\ X'_m = \phi_m - \phi_0$$

wherein $E_m$ is an amplitude of the first antenna group, $E_0$ is an amplitude of an initial composite EFV of the plurality of antenna groups, $\phi_m$ is an initial phase angle of the first antenna group, and $\phi_0$ is a phase angle of the initial composite EFV.

6. The calibration method of claim 1, wherein the plurality of antenna groups comprise at least three antenna groups.

7. A calibration method for a large-scale antenna array, wherein the large-scale antenna array comprises a first antenna group and a second antenna group, wherein the calibration method comprises:

performing an intra-group calibration on the first antenna group;

setting the first antenna group and the second antenna group as an antenna group set, wherein the second antenna group comprises a first antenna; and powering on the first antenna group and the second antenna group to perform the intra-group calibration on the first antenna in the antenna group set based on a first rotating element electric field method, comprising:

powering on the first antenna in the antenna group set at a first power and powering on other antennas in the antenna group set at a second power, wherein the second power is a product of the first power and a first real number, wherein the first real number is greater than one;

adjusting a first phase angle of the first antenna to measure a first composite electric field (EFV) of the antenna group set after the first antenna and the other antennas are powered on;

obtaining a first solution and a second solution corresponding to a first calibration value of the first antenna according to the first composite EFV based on the first rotating element electric field vector method.

8. The calibration method of claim 7, further comprising:

performing the intra-group calibration on the first antenna group based on a second rotating element electric field vector method.

9. The calibration method of claim 8, wherein the step of performing the intra-group calibration on the first antenna group based on the second rotating element electric field vector method comprises:

powering on a second antenna in the first antenna group at a third power, and powering on other antennas in the first antenna group at a fourth power, wherein the fourth power is a product of the third power and a second real number, wherein the second real number is greater than one;

adjusting a second phase angle of the second antenna to measure a second composite EFV of the first antenna group after the second antenna and the other antennas are powered on; and obtaining a third solution and a fourth solution corresponding to a second calibration value of the second antenna according to the second composite EFV based on the second rotating element electric field vector method.

10. The calibration method of claim 9, wherein the step of performing the intra-group calibration on the first antenna group based on the second rotating element electric field vector method further comprises:

selecting the third solution from the third solution and the fourth solution to calibrate the second antenna, wherein the third solution satisfies the following equation:

$$Y > k'_{n,m},\ k'_{n,m} = \frac{E_{n,m}}{E_{0,m}},\ Y^2 = (\cos X'_{n,m} - k'_{n,m})^2 + \sin^2 X'_{n,m},\ X'_{n,m} = \phi_{n,m} - \phi_{0,m}$$

wherein $E_{n,m}$ is an amplitude of the second antenna, $E_{0,m}$ is an amplitude of an initial composite EFV of the first antenna group, $\phi_{n,m}$ is an initial phase angle of the second antenna, and $\phi_{0,m}$ is a phase angle of the initial composite EFV.

11. The calibration method of claim 7, wherein the step of performing the intra-group calibration on the first antenna in the antenna group set based on the first rotating element electric field vector method further comprises:

selecting the first solution from the first solution and the second solution to calibrate the first antenna, wherein the first solution satisfies the following equation:

$$Y > k'_{n,i},\ k'_{n,i} = \frac{E_{n,i}}{E_{0,i}},\ Y^2 = (\cos X'_{n,i} - k'_{n,i})^2 + \sin^2 X'_{n,i},\ X'_{n,i} = \phi_{n,i} - \phi_{0,i}$$

wherein $E_{n,i}$ is an amplitude of the first antenna, $E_{0,i}$ is an amplitude of an initial composite EFV of the antenna group set, $\phi_{n,i}$ is an initial phase angle of the first antenna, and $\phi_{0,i}$ is a phase angle of the initial composite EFV.

12. A calibration device for a large-scale antenna array, wherein the large-scale antenna array comprises a plurality of antenna groups, wherein the calibration device comprises:

a transceiver coupled to the large-scale antenna array; and a processor coupled to the transceiver, wherein the processor is configured to perform:

performing an intra-group calibration on each antenna group in the plurality of antenna groups via the transceiver; and powering on each of the antenna groups of the plurality of antenna groups via the transceiver to perform an inter-group calibration on a first antenna group in the plurality of antenna groups based on a rotating element electric field method, comprising:

powering on the first antenna group in the plurality of antenna groups at a first power and powering on other antenna groups in the plurality of antenna groups at a second power, wherein the second power is a product of the first power and a real number, wherein the real number is greater than one;

adjusting a phase angle of the first antenna group to measure a composite electric field (EFV) of the plurality of antenna groups after the first antenna group and the other antenna groups are powered on; and obtaining a first solution and a second solution corresponding to a calibration value of the first antenna group according to the composite EFV based on the rotating element electric field vector method.

13. A calibration device for a large-scale antenna array, wherein the large-scale antenna array comprises a first antenna group and a second antenna group, wherein the calibration device comprises:

a transceiver coupled to the large-scale antenna array; and a processor coupled to the transceiver, wherein the processor is configured to perform:

performing an intra-group calibration on the first antenna group via the transceiver;

setting the first antenna group and the second antenna group as an antenna group set, wherein the second antenna group comprises a first antenna; and powering on the first antenna group and the second antenna group to perform the intra-group calibration on the first antenna in the antenna group set based on a rotating element electric field method, comprising:

powering on the first antenna in the antenna group set at a first power and powering on other antennas in the antenna group set at a second power, wherein the second power is a product of the first power and a real number, wherein the real number is greater than one;

adjusting a phase angle of the first antenna to measure a composite electric field (EFV) of the antenna group set after the first antenna and the other antennas are powered on;

obtaining a first solution and a second solution corresponding to a calibration value of the first antenna according to the composite EFV based on the rotating element electric field vector method.

* * * * *